United States Patent
Vaquero-Caballero et al.

(10) Patent No.: US 11,133,864 B1
(45) Date of Patent: Sep. 28, 2021

(54) MEASUREMENT OF CROSSTALK

(71) Applicant: Ciena Corporation, Hanover, MD (US)

(72) Inventors: Francisco Javier Vaquero-Caballero, Valladolid (ES); Kevin Stuart Farley, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/857,331

(22) Filed: Apr. 24, 2020

(51) Int. Cl.
*H04B 10/50* (2013.01)
*H04B 10/079* (2013.01)
*H04B 10/516* (2013.01)

(52) U.S. Cl.
CPC ... *H04B 10/07953* (2013.01); *H04B 10/5161* (2013.01)

(58) Field of Classification Search
CPC .............. H04B 10/07953; H04B 10/5161
See application file for complete search history.

(56) References Cited

U.S. PATENT DOCUMENTS

| | | | | |
|---|---|---|---|---|
| 2,696,531 A * | 12/1954 | Comte | ............... | H04B 3/487 324/628 |
| 4,236,244 A * | 11/1980 | Strehl | ............... | H04L 5/143 370/295 |
| 5,317,440 A * | 5/1994 | Hsu | ............... | H04J 14/02 398/41 |
| 5,640,285 A * | 6/1997 | Maurice | ............... | G11B 15/12 360/46 |
| 2002/0126291 A1 * | 9/2002 | Qian | ............... | H04J 14/02 359/577 |
| 2004/0005150 A1 * | 1/2004 | Takeshita | ............... | H04B 10/00 398/32 |
| 2006/0056855 A1 * | 3/2006 | Nakagawa | ............... | H05B 47/195 398/183 |
| 2008/0129286 A1 * | 6/2008 | Kahlman | ............... | G01R 33/1269 324/225 |
| 2008/0138070 A1 * | 6/2008 | Yan | ............... | H04J 14/06 398/65 |
| 2008/0211973 A1 * | 9/2008 | Hekstra | ............... | G09G 3/3413 348/760 |
| 2008/0309329 A1 * | 12/2008 | Kahlman | ............... | G01R 33/1269 324/228 |
| 2009/0263142 A1 * | 10/2009 | Shen | ............... | G02F 1/225 398/158 |
| 2011/0018465 A1 * | 1/2011 | Ashdown | ............... | H05B 45/22 315/294 |

(Continued)

*Primary Examiner* — Tanya T Motsinger
(74) *Attorney, Agent, or Firm* — Clements Bernard Walker; Lawrence A. Baratta, Jr.; Christopher L. Bernard

(57) ABSTRACT

A first signal is generated having a first frequency spectrum comprising one or more stopbands in which components of the first signal exhibit attenuated energy relative to an average energy of the first signal. A second signal is generated having a second frequency spectrum comprising non-zero energy at frequencies within the one or more stopbands. A third signal is generated by a crosstalk-inducing subsystem from a combination of the first signal and the second signal. The third signal is detected at a receiver device and an estimate of crosstalk induced by the crosstalk-inducing subsystem is calculated using a measurement of the third signal at the frequencies within the one or more stopbands. According to some examples, the second frequency spectrum comprises a tone within at least one of the stopbands.

20 Claims, 6 Drawing Sheets

(56) References Cited

U.S. PATENT DOCUMENTS

| | | | | |
|---|---|---|---|---|
| 2011/0309754 | A1* | 12/2011 | Ashdown | H05B 45/22 315/151 |
| 2014/0293393 | A1* | 10/2014 | Fondeur | G02F 1/21 359/288 |
| 2015/0341116 | A1* | 11/2015 | Olsson | H04L 27/2096 398/28 |
| 2015/0369755 | A1* | 12/2015 | Nakamura | G01R 31/311 356/237.5 |
| 2016/0073067 | A1* | 3/2016 | Jones | H04N 9/04515 348/216.1 |
| 2016/0119026 | A1* | 4/2016 | Strobel | H04B 3/487 370/201 |
| 2016/0154193 | A1* | 6/2016 | Brukilacchio | G02B 21/16 315/151 |
| 2016/0246111 | A1* | 8/2016 | Chen | G02F 1/1362 |
| 2017/0078792 | A1* | 3/2017 | Simons | B41J 2/04581 |
| 2017/0191964 | A1* | 7/2017 | Faur | H01J 49/022 |
| 2017/0276772 | A1* | 9/2017 | Tokuda | G01S 7/4861 |
| 2018/0183525 | A1* | 6/2018 | Capriata | H04B 10/2507 |
| 2019/0238236 | A1* | 8/2019 | Mii | H04B 10/67 |
| 2019/0326458 | A1* | 10/2019 | Zhang | H01L 31/022408 |
| 2020/0076528 | A1* | 3/2020 | Cavaliere | H04J 14/0226 |
| 2020/0174098 | A1* | 6/2020 | Lang | G01S 7/4008 |
| 2020/0396426 | A1* | 12/2020 | Price | G02B 26/101 |

* cited by examiner

MEASUREMENT OF CROSSTALK

TECHNICAL FIELD

This document relates to the technical field of communications.

BACKGROUND

Interference, or crosstalk, may arise between different channels in a communications system. For example, a first communications signal may be contaminated with crosstalk from a second communications signal, which may impact the ability to accurately decode data being conveyed by the first communications signal. The ability to obtain an accurate measurement of the crosstalk contribution from the second communications signal to the first communications signal may be advantageous. For example, such a measurement may be used to mitigate the crosstalk through the application of crosstalk precompensation to the first communications signal. Crosstalk measurements may also provide information about the performance of the communications system.

SUMMARY

According to a broad aspect, a system and a method are disclosed for the measurement of crosstalk. The system comprises circuitry configured to perform the method, wherein the method comprises generating a first signal having a first frequency spectrum comprising one or more stopbands in which components of the first signal exhibit attenuated energy relative to an average energy of the first signal. The method further comprises generating a second signal having a second frequency spectrum comprising non-zero energy at frequencies within the one or more stopbands. The method further detecting a third signal generated by a crosstalk-inducing subsystem from a combination of the first signal and the second signal. The method further comprises calculating an estimate of crosstalk induced by the crosstalk-inducing subsystem using a measurement of the third signal at the frequencies within the one or more stopbands.

According to some examples, the second frequency spectrum comprises a tone within at least one of the stopbands.

According to some examples, the method further comprises generating a plurality of different versions of the first signal, each different version of the first signal comprising at least one stopband that is unique amongst all stopbands comprised in the plurality of different versions of the first signal, detecting a plurality of different versions of the third signal, each different version of the third signal corresponding to a different version of the first signal, and calculating a plurality of different crosstalk estimates, each crosstalk estimate calculated using a measurement of a different version of the third signal at frequencies within the at least one unique stopband.

According to some examples, the method further comprises generating a plurality of different versions of the second signal respectively corresponding to the plurality of different versions of the first signal, each different version of the second signal comprising a tone within the at least one unique stopband of the corresponding version of the first signal.

According to some examples, the crosstalk-inducing subsystem comprises a first electrical-to-optical (E/O) modulator configured to be driven based on the first signal, and a second E/O modulator configured to be driven based on the second signal, wherein the first E/O modulator is biased for intensity detection and the second E/O modulator is biased for minimum transmission.

According to some examples, the method further comprises calculating at least one crosstalk precompensation term using the estimate of the crosstalk.

According to some examples, the method further comprises providing an assessment of system performance based on the estimate of the crosstalk.

According to some examples, a known portion of the attenuated energy of the first signal is substantially zero, and a known portion of the non-zero energy of the second signal is significantly greater than any unknown portion of the non-zero energy of the second signal.

According to some examples, a part of the third signal attributable to any unknown portion of the attenuated energy of the first signal does not exceed a predetermined value, wherein the predetermined value is equal to a power ratio of a part of the third signal attributable to the known portion of the non-zero energy of the second signal relative to a minimum signal-to-noise ratio (SNR) of the third signal.

According to some examples, the method further comprises generating one or more additional first signals, wherein each additional first signal comprises components within the one or more stopbands exhibiting attenuated energy relative to an average energy of the additional first signal, detecting one or more additional third signals, wherein each additional third signal is generated by the crosstalk-inducing subsystem from a combination of the first signal, one of the additional first signals, and the second signal, and calculating the estimate of the crosstalk induced by the crosstalk-inducing subsystem using measurement of the one or more additional third signals at the frequencies within the one or more stopbands.

DETAILED DESCRIPTION

Figure 1:
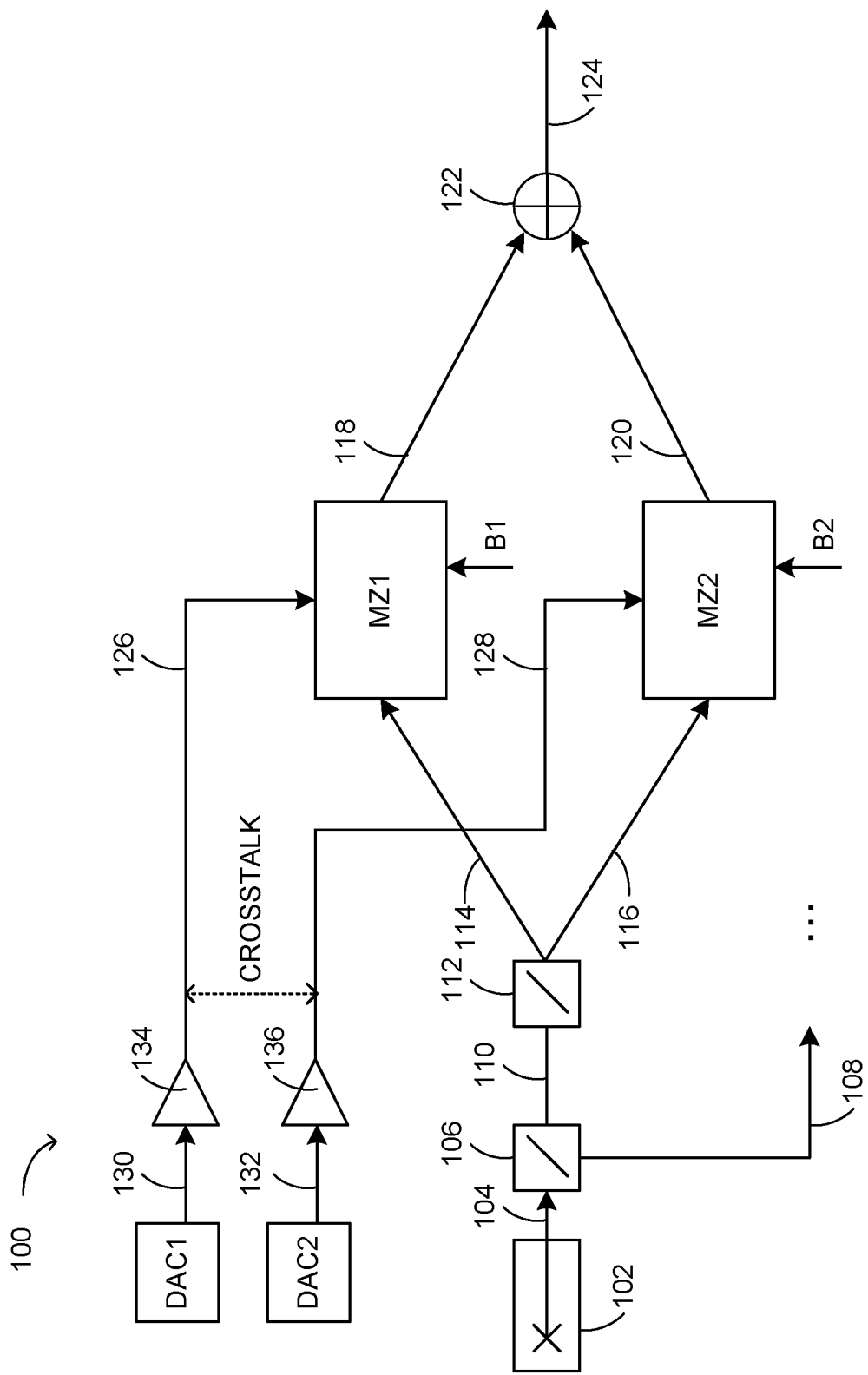
FIG. 1 illustrates a schematic of an example optical communications system which induces crosstalk between two signals.

FIG. 1 illustrates a schematic of an example optical communications system 100 which comprises a crosstalk-inducing subsystem.

The system 100 may be configured to generate a dual polarization quadrature amplitude modulation (DP-QAM) signal. A LASER 102 is configured to generate a continuous wave (CW) optical carrier 104, which is split by a polarizing beam splitter 106 into polarized components 108 and 110. For example, the signal 108 may denote the X component and the signal 110 may denote the Y component, or vice versa. For simplicity, FIG. 1 illustrates the processing applied to the signal 110 only. It is contemplated that similar processing may be applied to the signal 108.

The signal 110 is split by a beam splitter 112 into components 114 and 116 which are modulated, respectively, by parallel electrical-to-optical (E/O) modulators, in this case, Mach-Zehnder modulators, denoted MZ1 and MZ2. While the examples presented herein refer to Mach-Zehnder modulators, other modulators are possible, such as electro-absorption modulators. The relative phase of the modulators MZ1 and MZ2 is controlled by their respective biases, denoted B1 and B2. According to some examples, the biases B1 and B2 may be selected such that the respective output signals 118 and 120 are orthogonal to each other. Accordingly, the signal 118 may be used to convey in-phase (I) data, while the signal 120 may be used to convey quadrature (Q) data, or vice versa. According to some examples, the signals 118 and 120 may be combined using a beam combiner 122, thereby forming an output signal 124. Although not shown in FIG. 1, the output signal 124 may further be combined with an output signal originating from the orthogonal component 108.

The modulators MZ1 and MZ2 are driven by signals 126 and 128, respectively. The signals 126 and 128 are based on respective outputs 130 and 132 of digital-to-analog converters (DACs), denoted DAC1 and DAC2. The outputs 130 and 132 may be amplified by amplifiers 134 and 136 to generate the signals 126 and 128, respectively.

The outputs 130 and 132 comprise independent streams of data to be conveyed using the modulators MZ1 and MZ2, respectively. Ideally, the signals 126 and 128 would be independent from each other, such that the signal 118 is exclusively based on the output 130 of DAC1, and such that the signal 120 is exclusively based on the output 132 of DAC2. However, in practice, the signal paths from DAC1 to MZ1 and DAC2 to MZ2 are not perfectly isolated from each other. This may lead to interference, or crosstalk, between the signal paths. As a result of this crosstalk, some portion of the signal 118 output by the modulator MZ1 may depend on the signal 132 output by DAC2. Similarly, some portion of the signal 120 output by the modulator MZ2 may depend on the signal 130 output by DAC1. In general, the components of a system that induce or contribute to crosstalk may be referred to as a crosstalk-inducing subsystem. In order to quantify the amount of crosstalk in a system, it is helpful to use a model to represent the effects of the crosstalk-inducing subsystem.

Figure 2:
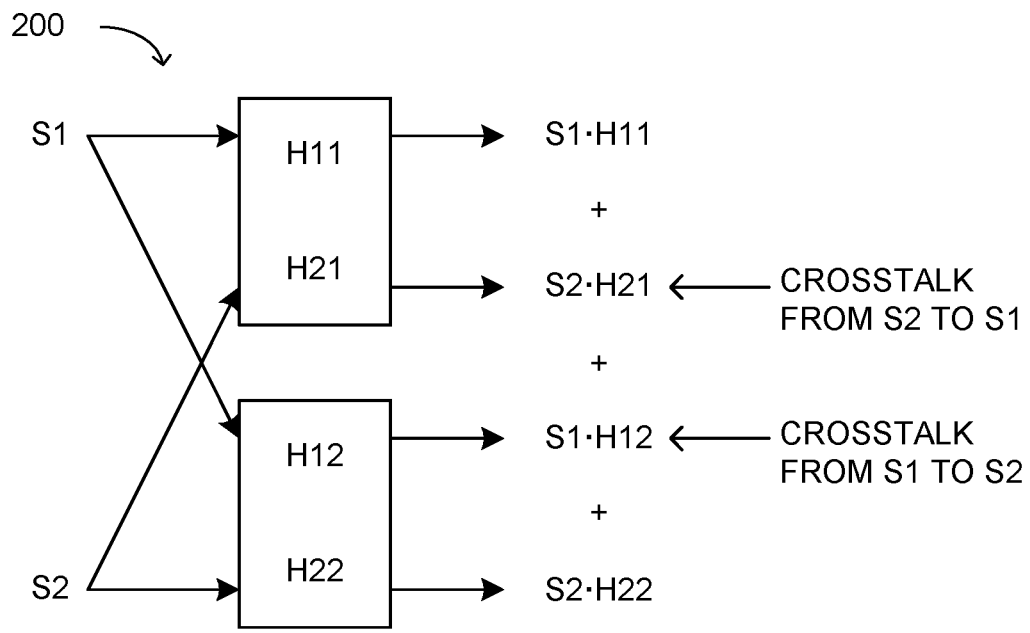
FIG. 2 illustrates a schematic of an example model for a subsystem which induces crosstalk between two signals.

FIG. 2 illustrates a schematic of an example model 200 for a subsystem which induces crosstalk between two input signals. According to one example, the two input signals may comprise the signals 130 and 132, respectively, and the model 200 may represent the portion of the system 100 that processes the signals 130 and 132 to generate the output signal 124. For example, the signals 130 and 132 may undergo effects caused by the amplifiers 134 and 136 and any other circuitry on their respective signal paths to the modulators MZ1 and MZ2, as well as effects caused by the modulators MZ1 and MZ2 themselves, before the signals are ultimately added together to form the output signal 124. The combination of these effects on the input signals 130 and 132 may be represented by the model 200.

If the signals 130 and 132 are represented in the frequency domain by S1(f) and S2(f), respectively, where f denotes frequency, the model 200 may be represented by matrix multiplication using a 2×2 matrix consisting of four transfer functions, denoted H11(f), H21(f), H12(f), and H22(f), respectively. As provided in Equation 1, multiplication of the matrix by the frequency-domain signals S1(f) and S2(f) results in a signal S(f), which represents the frequency-domain version of the output signal 124.

$$S(f) = \begin{bmatrix} H11(f) & H21(f) \\ H12(f) & H22(f) \end{bmatrix} \begin{bmatrix} S1(f) \\ S2(f) \end{bmatrix} \quad [1]$$

H11 represents the frequency response to the signal S1 of the portion of the system that is intended to process the signal S1 (referred to as the S1 path), while H22 represents the frequency response to the signal S2 of the portion of the system that is intended to process the signal S2 (referred to as the S2 path). For example, referring to the system 100, the S1 path might be understood to comprise the elements and/or circuitry through which the signal 130 is designed to be transmitted and/or processed in the course of generating the signal 118. Thus, the S1 path might comprise the amplifier 134, the path travelled by the signal 126, and the modulator MZ1. The S2 path might be understood to comprise the elements and/or circuitry through which the signal 132 is designed to be transmitted and/or processed in the course of generating the signal 120. Thus, the S2 path might comprise the amplifier 136, the path travelled by the signal 128, and the modulator MZ2.

H21 represents the frequency response of the S1 path to the signal S2, while H12 represents the frequency response of the S2 path to the signal S1. In the absence of any crosstalk in the system, the frequency response of the S1 path to the signal S2 is identically zero (i.e., H21=0), and the frequency response of the S2 path to the signal S1 is identically zero (i.e., H12=0). In this case, Equation 1 predicts that S=S1·H11+S2·H22. However, in the presence of crosstalk (i.e., H21≠0, H12≠0), Equation 1 predicts that S=S1·H11+S2·H21+S1·H12+S2·H22. The term S2·H21 denotes the crosstalk from the signal S2 to the S1 path, while the term S1·H12 denotes the crosstalk from the signal S1 to the S2 path.

Generally, the crosstalk terms S2·H21 and S1·H12 represent undesirable noise in the system. Information about the amount of crosstalk in the output signal S may be used to assess system performance. In addition, accurate measurements of the crosstalk terms may be used to calculate crosstalk precompensation terms, which may be applied, for example, in a digital signal processor (DSP), to mitigate the effects of crosstalk in the system. For example, the crosstalk experienced by the signal S1 from the signal S2 may be reduced by subtracting a precompensation term (S1·H12/H22) from the signal S2. Similarly, the crosstalk experienced by the signal S2 from the signal S1 may be reduced by subtracting a precompensation term (S2·H21/H11) from the signal S1. The precompensation terms (S1·H12/H22) and (S2·H21/H11) themselves may contribute to crosstalk, but their contributions may be considered effectively negligible in comparison to the output signal S.

According to some examples, estimates of the crosstalk transfer functions H21 and H12 may be obtained by measuring the output signal S while isolating different parts of the 2×2 matrix. In the case of the system 100, this may be achieved, for example, through appropriate selection of the biases B1 and B2, while "turning on" and "turning off" different combinations of the signals S1 and S2. Referring to the system, the signal 130 may be considered "turned on" if the DAC1 has been loaded with values that include non-zero values, while the signal 130 may be considered "turned off"

if the DAC1 has been turned off or loaded with an instruction to produce a zero (or negligible) energy output. According to some examples, the intensity of either the signal 130 or the signal 132 could be modulated in order to estimate variation of the crosstalk.

For each modulator MZ1 and MZ2, the relationship between the drive voltage and the output optical field is dependent on the choice of bias point on the sinusoidal transfer function of that modulator. For example, the relationship between the drive voltage 126 and the output optical field 118 is dependent on the bias point selected on the transfer function of the modulator MZ1.

Figure 3:
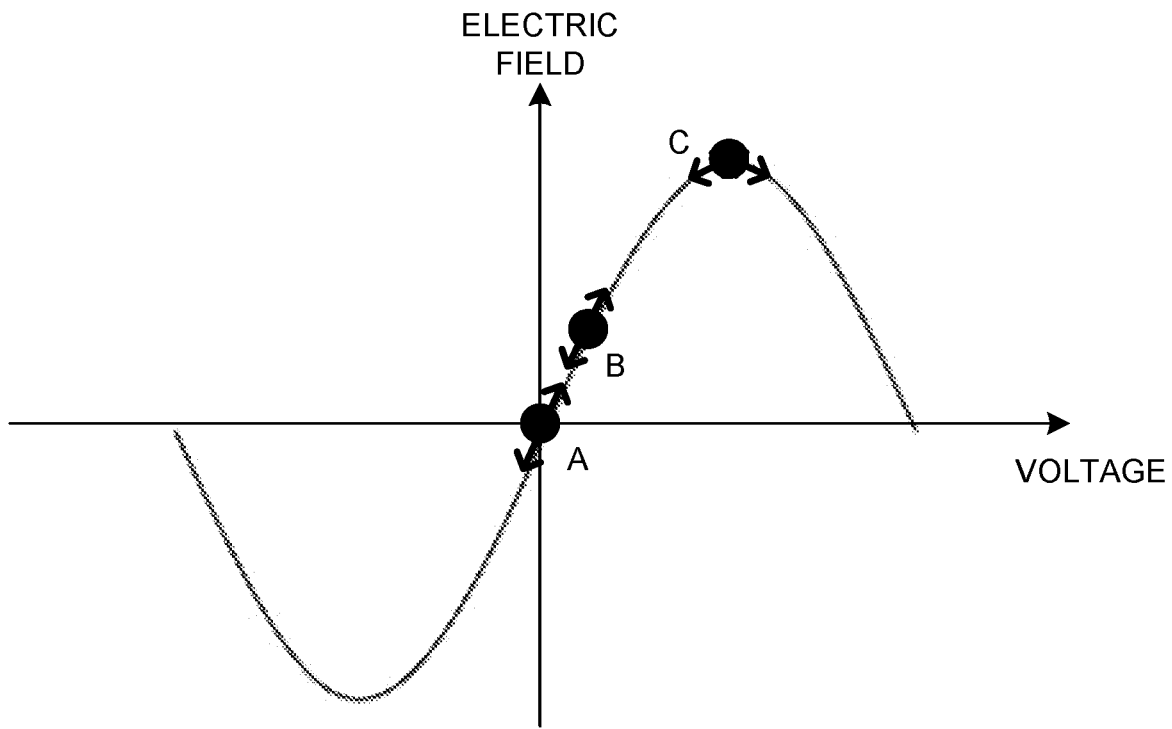
FIG. 3 illustrates examples of different bias points on a modulator transfer function.

FIG. 3 illustrates examples of different bias points on a modulator transfer function. The bias point A is set such that a drive voltage of zero corresponds to an optical field of zero. In this case, the optical field will move between positive and negative values, corresponding to the positive and negative values of the drive voltage. As long as the drive voltage does not extend into the nonlinear regions of the sinusoid, the optical field will be approximately linearly proportional to the drive voltage. Because the bias point A results in both positive and negative optical field values, phase information is needed to decode the signal, thereby necessitating a coherent receiver. Accordingly, this type of biasing is referred to as "biasing for coherent detection."

The bias point B is set slightly higher than the bias point A, but still within the linear region of the sinusoidal transfer function. Accordingly, the optical field will still be proportional to the drive voltage, but will now comprise only positive values. The absence of negative values may permit direct detection via a photodetector and an oscilloscope, thereby avoiding the need for a coherent receiver. This type of biasing is referred to as "biasing for intensity detection." The fact that the signal can be decoded without a coherent receiver may be advantageous when seeking to estimate the crosstalk transfer functions H21 and H12, since a coherent receiver will itself introduce crosstalk into the system, which would require a more elaborate model than the one expressed in Equation 1.

According to another example, the bias point may be set at either the minimum point or the maximum point of the sinusoidal transfer function. For example, the bias point may be set at point C, as illustrated in FIG. 3. This is referred to as "biasing for minimum transmission." Because the derivative of the transfer function in this region is very small relative to the linear region of the sinusoid, selection of this bias point may be used to achieve significant signal attenuation. This may prove useful for isolating different components of the 2×2 matrix that represents the system 100. Another interesting property of the minimum-transmission bias point is that it is located in the quadratic region of the sinusoid, such that any frequency content modulated at this point will experience a nonlinear transfer function. According to some examples, the effect of this nonlinearity may be exploited, as will be described further with respect to FIG. 5.

As previously noted, estimates of the crosstalk transfer functions H21 and H12 representing the system 100 may be obtained by measuring the output signal 124 (i.e., the signal S) while isolating different parts of the 2×2 matrix by "turning on" and "turning off" different combinations of the signal 130 (i.e., the signal S1) and the signal 132 (i.e., the signal S2). The isolation or extraction of different terms in Equation 1 may be achieved, in part, by appropriate selection of bias points for the modulators MZ1 and MZ2. Different versions of the output signal 124 may be obtained under different sets of conditions (i.e., different combinations of the signals 130 and 132, and different combinations of the bias points for MZ1 and MZ2). In the following examples, $S_i$ denotes the Fourier transform of the $i^{th}$ version of the output signal 124 (i.e., corresponding to the $i^{th}$ set of conditions).

For example, the crosstalk transfer function H21 may be estimated using measurements obtained while the bias B1 is set for intensity detection (e.g., point B in FIG. 3) and the bias B2 is set for minimum transmission (e.g., point C in FIG. 3). The effect of this biasing combination is that the S2 path is significantly attenuated relative to the S1 path, such that Equation 1 may be simplified based on an assumption that the values of H12 and H22 are negligible relative to the values of H21 and H11. If the output signal 124 is captured under these conditions, the Fourier transform of the signal 124 may be represented as $S_A \approx S1 \cdot H11 + S2 \cdot H21$, where the signal S1 corresponds to the Fourier transform of the signal 130, and the signal S2 corresponds to the Fourier transform of the signal 132. If an additional measurement of the output signal 124 is made using the same biasing combination, but with the signal 132 electrically "turned off" (i.e., S2=0), the additional measurement of the output signal 124 may be represented in the frequency domain as $S_B \approx S1 \cdot H11$. Using the difference between these two measurements, it may be possible to calculate an estimate of the crosstalk transfer function H21. That is, subtracting the signal $S_B$ from the signal $S_A$ results in the value $S2 \cdot H21$, where S2 is the Fourier transform of the known signal 132 that was used during the measurement of $S_A$, thereby permitting the estimation of H21.

In a similar manner, the crosstalk transfer function H12 may be estimated using measurements obtained while the bias B1 is set for minimum transmission (e.g., point C in FIG. 3) and the bias B2 is set for intensity detection (e.g., point B in FIG. 3). The effect of this biasing combination is that the S1 path is significantly attenuated relative to the S2 path, such that Equation 1 may be simplified based on an assumption that the values of H21 and H11 are negligible relative to the values H12 and H22. The Fourier transform of the output signal 124 captured under these conditions may be represented as $S_C \approx S2 \cdot H22 + S1 \cdot H12$, where the signal S1 corresponds to the Fourier transform of the signal 130, and the signal S2 corresponds to the Fourier transform of the signal 132. If an additional measurement of the output signal 124 is made using the same biasing combination, but with the signal 130 electrically turned off (i.e., S1=0), the additional measurement of the output signal 124 may be represented in the frequency domain as $S_D \approx S2 \cdot H22$. Using the difference between these two measurements, it may be possible to calculate an estimate of the crosstalk transfer function H12. That is, subtracting the signal $S_D$ from the signal $S_C$ results in the value $S1 \cdot H12$, where S1 is the Fourier transform of the signal 130 that was used during the measurement of $S_C$, thereby permitting the estimation of H12.

According to some examples, the estimates of the crosstalk transfer functions H21 and H12 may be used to calculate the crosstalk precompensation terms (S1·H12/H22) and (S2·H21/H11) to be subtracted from the signals 130 and 132, respectively, in order to mitigate the effects of crosstalk in the system 100. The value of H22 needed to calculate the precompensation term (S1·H12/H22) may be obtained from the measurement of $S_D$ and knowledge of the Fourier transform of the signal 132 that was used during the measurement of $S_D$. The value of H11 needed to calculate the precompensation term (S2·H21/H11) may be obtained from the measurement of $S_B$ and knowledge of the Fourier transform of the signal 130 that was used during the measurement of $S_B$.

The calculations described above are based on the assumption that the signal on a particular path is effectively eliminated when the modulator on that path is biased for minimum transmission. However, in reality, the signal on the minimum-transmission path still provides a small contribution to the output signal. For example, when the bias B2 is set for minimum transmission, the output signal 124 is primarily dependent on the signal 126 (represented by S1·H11+S2·H21 in the frequency domain), but the output signal 124 still comprises a small contribution from the signal 128 (represented by S2·H22+S1·H12 in the frequency domain). Failure to account for the contribution of the minimum-transmission path may reduce the accuracy of the H21 estimate. Similarly, when the bias B1 is set for minimum transmission, the output signal 124 still comprises a small contribution from the signal 126. Failure to account for this contribution may reduce the accuracy of the H12 estimate.

It is also notable that each of the estimates of H21 and H12 is dependent on the calculation of a difference between two signals. For example, H21 is calculated by subtracting the signal $S_B$ from the signal $S_A$. Because the noise on the signals is uncorrelated, the subtraction operation results in an estimate of H21 that suffers from enhanced noise due to the respective noise contributions from each signal. Similarly, the estimate of H12 will suffer from enhanced noise due to the uncorrelated noise contributed by the signals $S_C$ and $S_D$, respectively. The noise enhancement resulting from the subtraction operation may further reduce the accuracy of the H21 and H12 estimates.

According to some examples of the proposed technology, it may be possible to calculate estimates of crosstalk in a system without having to perform the subtraction operation described above. For example, given a system that exhibits crosstalk between a first input signal and a second input signal, measurement of the crosstalk contribution from the first input signal to the second input signal may be achieved by including a notch or a stopband in the frequency spectrum of the second input signal. Similarly, measurement of the crosstalk contribution from the second input signal to the first input signal may be achieved by including a notch or a stopband in the frequency spectrum of the first input signal.

Figure 4:
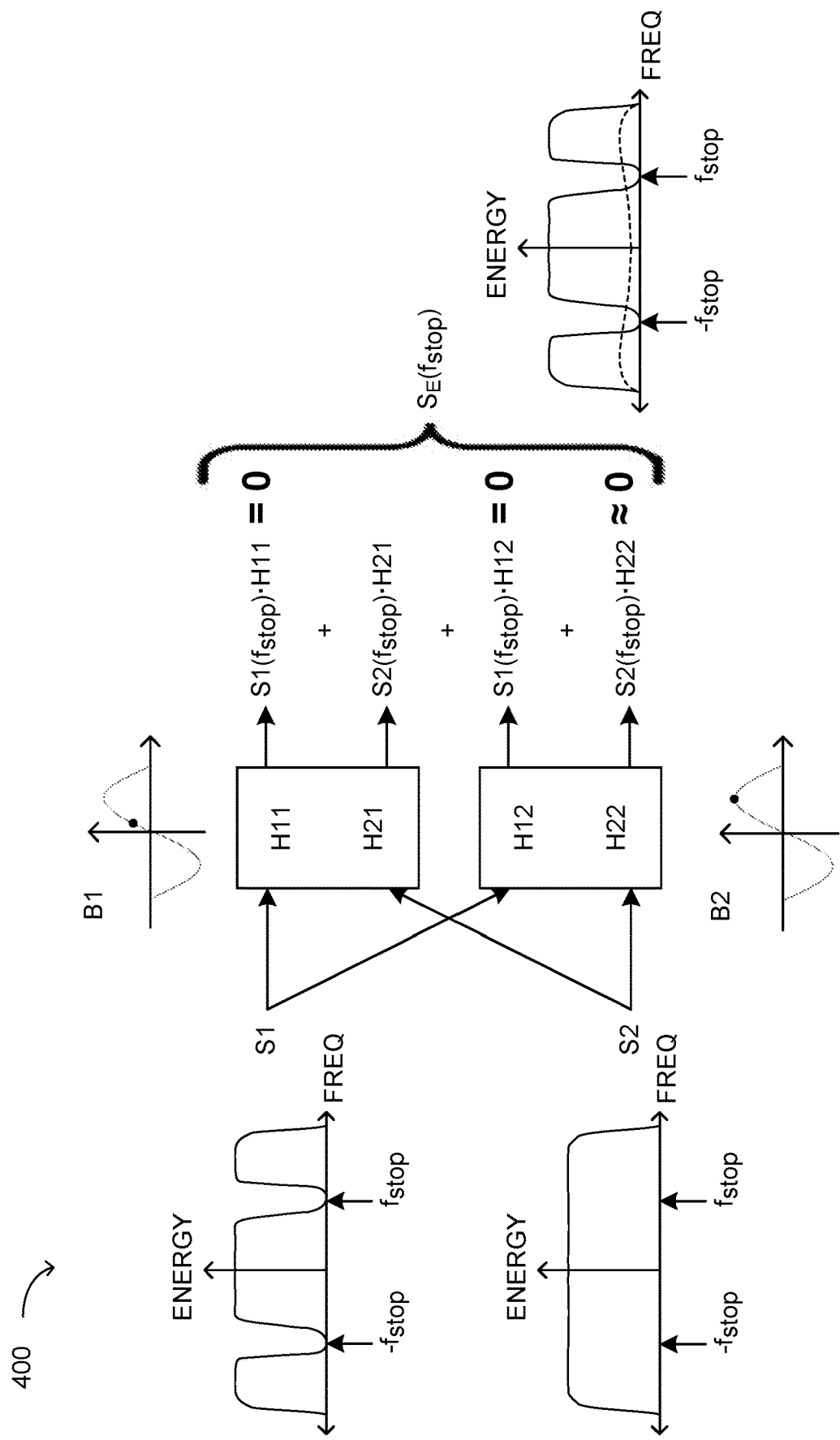
FIG. 4 illustrates a schematic of a first example technique for measuring crosstalk between two signals.

FIG. 4 illustrates a schematic 400 showing a first example technique for measuring crosstalk between two signals, S1 and S2. As described with respect to FIG. 2, the crosstalk between the signals S1 and S2 is generated by a system that is represented by the model 200. For example, S1 and S2 may correspond to the signals 130 and 132, respectively, in the system 100. As will be described further with respect to FIG. 7, this technique for measuring crosstalk may be implemented in a system such as the system 700, with measurements of the various signals S1 being obtained using a photodetector, such as the detector 716.

As described previously, the S2 path may be significantly attenuated relative to the S1 path, for example, if the bias B1 is set for intensity detection and the bias B2 is set for minimum transmission. However, even if it is assumed that the values of H12 and H22 are negligible relative to the values of H21 and H11, as described previously, the output signal $S_A$ is still dependent on the term S1·H11, since $S_A \approx$ S1·H11+S2·H21. This dependency is what necessitates the additional measurement to obtain $S_B \approx$ S1·H11, and the noise-enhancing subtraction operation $S_A - S_B$. It is herein proposed that, under these biasing conditions, the subtraction operation may be avoided by including a stopband in the signal S1, and by measuring the components of the output signal S that are located within the stopband. For the purposes of the examples illustrated in FIGS. 4 and 5, a stopband may be understood to refer to frequency components of a signal that exhibit an insignificant amount of energy. For example, the components of a signal within the stopband may be attenuated to the extent that they exhibit negligible energy relative to the noise on the signal. A stopband may be defined by at least one stopband frequency. According to some examples, a stopband may comprise a plurality of stopband frequencies, where the signal exhibits negligible energy at each of the stopband frequencies. According to some examples, each stopband frequency may represent a frequency bin of a Fourier transform. According to some examples, a stopband may be created by applying a stopband filter to a broadband signal.

According to the example of FIG. 4, the signal S1 is designed to include a stopband defined at a stopband frequency $f_{STOP}$, such that $S1(f_{STOP})=0$. In the case of real signals comprising both positive and negative frequency components, the stopband defined at $f_{STOP}$ is accompanied by a corresponding negative stopband defined at $-f_{STOP}$, such that $S1(-f_{STOP})=0$. As further illustrated in FIG. 4, the signal S2 comprises a broadband frequency spectrum with non-negligible energy at the stopband frequencies (i.e., non-zero, quantifiable energy), such that $S2(f_{STOP}) \neq 0$ and $S2(-f_{STOP}) \neq 0$. Given these two frequency spectra, if the S2 path is significantly attenuated (shown as a dashed line), a measurement of the output signal at the stopband frequency $f_{STOP}$ may be represented as $S_E(f_{STOP}) \approx S2(f_{STOP}) \cdot H21$. Because $S1(f_{STOP})=0$, the term $S1(f_{STOP}) \cdot H11$ is identically zero, so the output signal $S_E$ at the frequency $f_{STOP}$ is not dependent on the term S1·H11. Accordingly, the crosstalk transfer function H21 may be estimated from $S_E(f_{STOP})$ alone, without having to perform a subtraction operation. This simplified calculation may provide a more accurate estimate of H21.

It is also notable that this method of calculating H21 is not reliant on the previous assumption that the term S1·H12 can be ignored (due to H12 being negligible relative to H21). Now, with $S1(f_{STOP})=0$, the term $S1(f_{STOP}) \cdot H12$ is identically zero and can be eliminated from the calculation of H21. This may provide for a more accurate estimate of H21. The calculation of H21 is still, however, reliant on the assumption that the term $S2(f_{STOP}) \cdot H22$ may be ignored due to H22 being negligible relative to H21. Even if the S2 path is significantly attenuated, it is not entirely eliminated. The term $S2(f_{STOP}) \cdot H22$ may still provide a small contribution to the output signal which, if ignored, may limit the accuracy of the H21 estimate. This issue will be further described with respect to FIG. 5.

The process illustrated in FIG. 4 may be reversed in order to calculate an estimate of the crosstalk transfer function H12 (not shown). That is, the S1 path may be significantly attenuated relative to the S2 path, for example, if the bias B1 is set for minimum transmission and the bias B2 is set for intensity detection. The signal S2 may be designed to comprise a stopband at a stopband frequency $f_{STOP}$, such that $S2(f_{STOP})=0$. Meanwhile, the signal S1 may comprise a broadband frequency spectrum with non-negligible energy at the stopband frequency, such that $S1(f_{STOP}) \neq 0$. Given these two frequency spectra, if the S1 path is significantly attenuated, a measurement of the output signal at the stopband frequency $f_{STOP}$ may be represented as $S_G(f_{STOP}) \approx S1(f_{STOP}) \cdot H12$. Because $S2(f_{STOP})=0$, the term $S2(f_{STOP}) \cdot H22$ is identically zero, so the output signal $S_G$ at the frequency $f_{STOP}$ is not dependent on the term S2·H22. Accordingly, the crosstalk transfer function H12 may be estimated from $S_G(f_{STOP})$ alone, without having to perform a subtraction operation. Furthermore, with $S2(f_{STOP})$=0, the term $S2(f_{STOP})$·H21 is identically zero and can be eliminated from the calculation of H12. This may provide for a more accurate estimate of H12. The calculation of H12 is still, however, reliant on the assumption that the term $S1(f_{STOP})$·H11 may be ignored due to H11 being negligible relative to H12. The S1 path is significantly attenuated, but not entirely eliminated, so the term $S1(f_{STOP})$·H11 may still provide a small contribution to the output signal which, if ignored, may limit the accuracy of the H12 estimate.

According to some examples, the estimates of the crosstalk transfer functions H21 and H12 obtained using the above process may enable the calculation of the crosstalk precompensation terms (S2·H21/H11) and (S1·H12/H22), respectively. The value of H11 needed to calculate the precompensation term (S2·H21/H11) may be obtained by taking the Fourier transform of the output signal 124 when the signal 132 is electrically turned off, and the biases B1 and B2 are set for intensity detection and minimum transmission, respectively. Under these conditions, frequency-domain representation of the output signal 124 is $S_F \approx S1 \cdot H11$, where S1 is the Fourier transform of the known signal 130 that was used during the measurement of $S_F$, thereby permitting the estimation of H11. In a similar manner, the value of H22 needed to calculate the precompensation term (S1·H12/H22) may be obtained by taking the Fourier transform of the output signal 124 when the signal 130 is electrically turned off, and the biases B1 and B2 are set for minimum transmission and intensity detection, respectively. Under these conditions, frequency-domain representation of the output signal 124 is $S_H \approx S2 \cdot H22$, where S2 is the Fourier transform of the known signal 132 that was used during the measurement of $S_H$, thereby permitting the estimation of H22.

The estimate of the crosstalk transfer function H21 calculated according the technique shown in FIG. 4 may be somewhat dependent on the magnitude of the stopband frequency $f_{STOP}$. In practice, the crosstalk transfer functions H21 and H12 are each dependent on frequency. Generally, the amount of crosstalk between the signals S1 and S2 may increase at higher frequencies. According to some examples, the frequency dependence of the crosstalk transfer functions H21 and H12 may be characterized by repeating measurements at a plurality of different stopband frequencies.

According to some examples, a series of different signals may be generated, where the frequency spectrum of each signal comprises a different stopband centered at a different stopband frequency. For each different signal, a measurement within respective stopband of that signal may be used to determine how the crosstalk varies with frequency.

According to other examples, a signal may be generated with a frequency spectrum comprising a plurality of distinct stopbands, where each stopband is centered at a different stopband frequency. Measurements may be performed concurrently within the plurality of distinct stopbands to obtain information about the crosstalk at different frequencies.

In either of the above examples, the frequency resolution may be limited by the size of the frequency bins of the Fourier transform.

As described with respect to FIG. 4, the calculation of H21 ignores the contribution of $S2(f_{STOP})$·H22 to the output signal, based on the assumption that H22 is negligible relative to H21. However, despite the attenuation of the S2 path, the term $S2(f_{STOP})$·H22 may still contribute to the output signal, which may affect the accuracy of the H21 estimate. According to some examples, the contribution $S2(f_{STOP})$·H22 may be eliminated if the signal S2 is designed to have a frequency spectrum comprising a tone at the stopband frequency $f_{STOP}$. According to one example, the signal S2 could comprise a sinusoidal tone. As will be described below, the signal S2 may be designed such that, following the modulator non-linearity, none of the signal S2 appears in the stopband.

Figure 5:
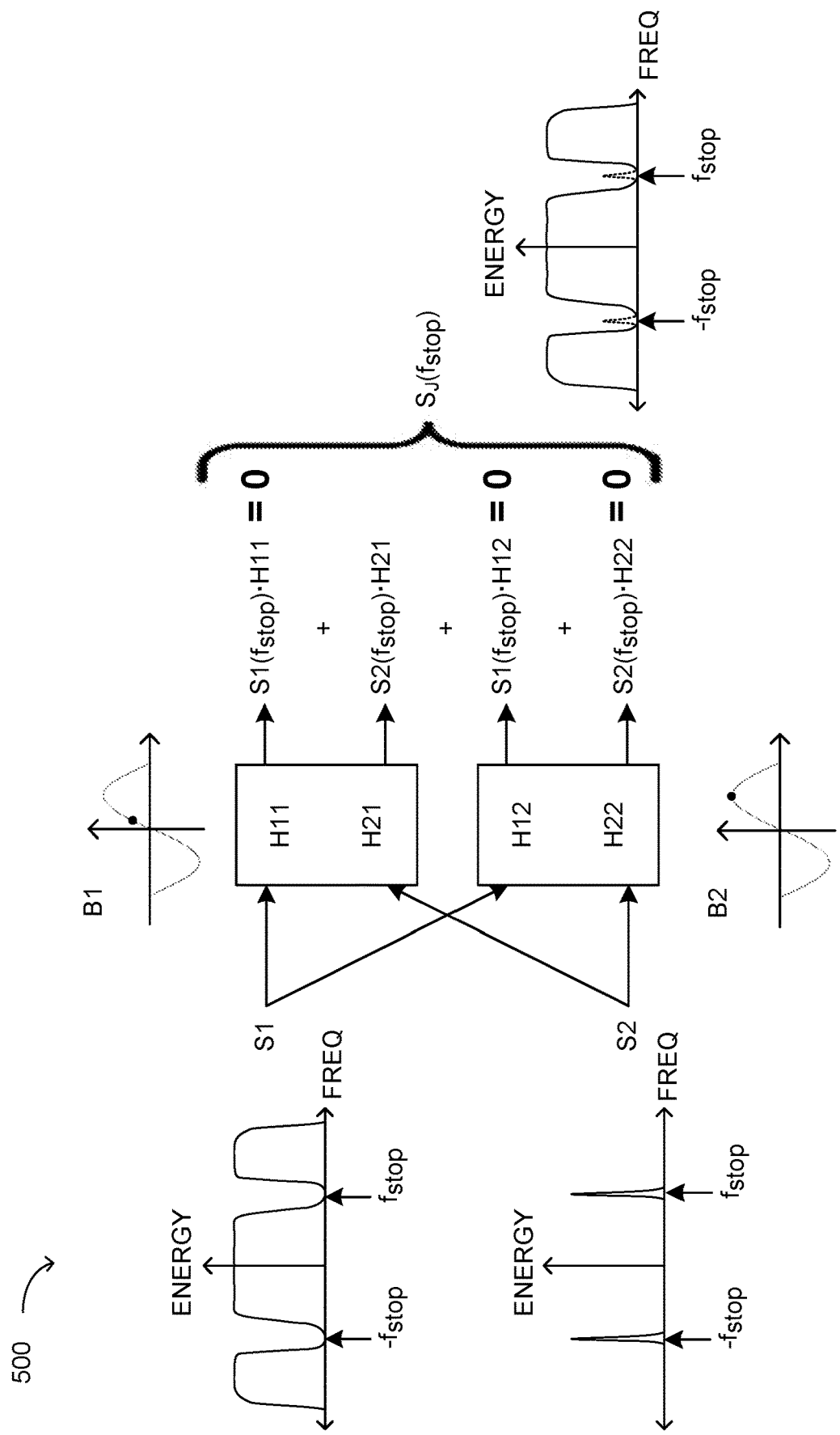
FIG. 5 illustrates a schematic of a second example technique for measuring crosstalk between two signals.

FIG. 5 illustrates a schematic 500 showing a second example technique for measuring crosstalk between two signals, S1 and S2. As described with respect to the preceding examples, the crosstalk between the signals S1 and S2 is generated by a system that is represented by the model 200. For example, S1 and S2 may correspond to the signals 130 and 132, respectively, in the system 100. As will be described further with respect to FIG. 7, this technique for measuring crosstalk may be implemented in a system such as the system 700, with measurements of the various signals S1 being obtained using a photodetector, such as the detector 716.

As described with respect to FIG. 4, the signal S1 is designed to include a stopband defined at the stopband frequency $f_{STOP}$, such that $S1(f_{STOP})$=0, and the bias B1 is set for intensity detection. As before, the S2 path is attenuated by setting the bias B2 for minimum transmission. Now, however, instead of the signal S2 comprising a broadband frequency spectrum, the signal S2 is designed to include a tone defined at the stopband frequency $f_{STOP}$ (and a corresponding tone defined at $-f_{STOP}$).

Because the S2 path is biased for minimum transmission, the bias point is located in the nonlinear region of the modulator's sinusoidal transfer function. Accordingly, the signal on this path experiences a nonlinearity. The effect of a nonlinearity on an input signal is to produce harmonics at higher frequencies. In this case, because the input signal S2 comprises a tone at the frequency $f_{STOP}$, the effect of the nonlinearity is to shift the tone to a frequency that is higher than $f_{STOP}$. This has the advantage of shifting the tone such that it no longer coincides with the frequency $f_{STOP}$. In other words, the term $S2(f_{STOP})$·H22 is identically zero. It follows that the output signal at $f_{STOP}$ may be represented as $S_J(f_{STOP})=S2(f_{STOP})$·H21. Not only is the output signal independent of the terms $S1(f_{STOP})$·H11 and $S1(f_{STOP})$·H12 (due to the fact that $S1(f_{STOP})$=0 as a result of the stopband), but the output signal is also independent of the term $S2(f_{STOP})$·H22 (due to the effect that the minimum-transmission bias point has on the tone). Using this technique, it may be possible to estimate the crosstalk transfer function H21 without merely relying on the assumption that the S2 path has been entirely extinguished. This may lead to improved accuracy in the estimate of H21. In turn, this may be used to improve crosstalk precompensation.

The process illustrated in FIG. 5 may be reversed in order to calculate an estimate of the crosstalk transfer function H12 (not shown). That is, the S1 path may be significantly attenuated relative to the S2 path by setting the biases B1 and B2 for minimum transmission and intensity detection, respectively. The signal S2 may be designed to comprise a stopband at a stopband frequency $f_{STOP}$, such that $S2(f_{STOP})$=0. Meanwhile, the signal S1 may be designed to comprise a tone at the stopband frequency $f_{STOP}$. Given these two frequency spectra, if the S1 path undergoes a nonlinearity due to the minimum-transmission biasing, a measurement of the output signal at the stopband frequency $f_{STOP}$ may be represented as $S_K(f_{STOP})=S1(f_{STOP})$·H12. Not only is the output signal independent of the terms $S2(f_{STOP})$ ·H22 and S2($f_{STOP}$)·H21 (due to the fact that S2($f_{STOP}$)=0 as a result of the stopband), but the output signal is also independent of the term S1($f_{STOP}$)·H11 (due to the effect that the minimum-transmission bias point has on the tone). Accordingly, the crosstalk transfer function H21 may be estimated without merely relying on the assumption that the S1 path has been entirely extinguished. This may lead to improved accuracy in the estimate of H12. In turn, this may be used to improve crosstalk precompensation.

The examples described with respect to FIGS. 4 and 5 may be generalized for cases where S1($f_{STOP}$)≠0, and for cases where one or both of S1($f_{STOP}$) and S2($f_{STOP}$) include noise contributions. For example, the energy of the first signal at the stopband frequency, S1($f_{STOP}$), may comprise a first portion and a second portion, where the first portion comprises a predetermined or known amount of energy (i.e., signal), denoted by $S1_{KNOWN}(f_{STOP})$, and where the second portion comprises a random or unknown amount of energy (i.e., noise), denoted by $S1_{UNKNOWN}(f_{STOP})$. Similarly, the energy of the second signal at the stopband frequency, S2($f_{STOP}$), may also comprise a known portion, denoted by $S2_{KNOWN}(f_{STOP})$, and an unknown portion, denoted by $S2_{UNKNOWN}(f_{STOP})$. Referring to FIG. 2, the output signal from the S1 path at the stopband frequency, $f_{STOP}$, may be expressed by Equation 2:

$$S_{PATH1}(f_{STOP}) = [S1_{KNOWN}(f_{STOP}) + S1_{UNKNOWN}(f_{STOP})] \cdot H11(f_{STOP}) + [S2_{KNOWN}(f_{STOP}) + S2_{UNKNOWN}(f_{STOP})] \cdot H21(f_{STOP}) \quad [2]$$

A corresponding expression may be derived for the output signal from the S2 path, but instead using the terms H12($f_{STOP}$) and H22($f_{STOP}$).

By definition, the values of $S1_{KNOWN}(f_{STOP})$ and $S2_{KNOWN}(f_{STOP})$ may be known, while the value of H11($f_{STOP}$) may be obtained from a separate measurement, as described previously. If the output signal from the S1 path, denoted $S_{PATH1}(f_{STOP})$, is measured, and if the product $S1_{KNOWN}(f_{STOP}) \cdot H11(f_{STOP})$ is subtracted from that measurement, the resulting value may be expressed as the sum of a signal term, $S_T = [S2_{KNOWN}(f_{STOP}) \cdot H21(f_{STOP})]$, and a noise term, NT=$[S1_{UNKNOWN}(f_{STOP}) \cdot H11(f_{STOP}) + S2_{UNKNOWN}(f_{STOP}) \cdot H21(f_{STOP})]$. In other words, $S_{PATH1} - S1_{KNOWN}(f_{STOP})*H11(f_{STOP})$=ST+NT. It may be of interest to ensure that the power of the signal term ST and the power of the noise term NT satisfy a minimum SNR value, $SNR_{MIN}$, such that power(ST)/power(NT)≥$SNR_{MIN}$, where power(x)=x·x*, and where * denotes the complex conjugate. In other words, it may be desirable to satisfy the relationship expressed by Equation 3:

$$\frac{\text{power}(S2_{KNOWN}(f_{STOP}) \cdot H21(f_{STOP}))}{\text{power}(S2_{UNKNOWN}(f_{STOP}) \cdot H21(f_{STOP}) + S1_{UNKNOWN}(f_{STOP}) \cdot H11(f_{STOP}))} \geq SNR_{MIN} \quad [3]$$

As previously described with respect to the examples in FIGS. 4 and 5, the first signal S1 may be designed such that its energy within the one or more stopbands is substantially zero. If $S1_{KNOWN}(f_{STOP})$=0, it follows that $S1_{KNOWN}(f_{STOP}) \cdot H11(f_{STOP})$=0, and thus $S_{PATH1}$=ST+NT. If the second signal S2 is designed such that the known portion of S2 at the stopband frequency is significantly greater than any unknown portion of S2 at the stopband frequency, that is $S2_{KNOWN}(f_{STOP}) >> S2_{UNKNOWN}(f_{STOP})$, then Equation 3 may be simplified to the relationship expressed by Equation 4:

$$\frac{\text{power}(S2_{KNOWN}(f_{STOP}) \cdot H21(f_{STOP}))}{\text{power}(S1_{UNKNOWN}(f_{STOP}) \cdot H11(f_{STOP}))} \geq SNR_{MIN} \quad [4]$$

Equation 4 may be rearranged to solve for $S1_{UNKNOWN}(f_{STOP}) \cdot H11(f_{STOP})$, which represents the part of the output signal, $S_{PATH1}$, that is attributable to the unknown portion of the first signal S1. This is expressed by Equation 5:

$$\text{power}(S1_{UNKNOWN}(f_{STOP}) \cdot H11(f_{STOP})) \leq \frac{\text{power}(S2_{KNOWN}(f_{STOP}) \cdot H21(f_{STOP}))}{SNR_{MIN}} \quad [5]$$

Thus, according to Equation 5, the part of the output signal from the S1 path that is attributable to an unknown (noise) portion the first signal S1 may not exceed a predetermined value, where the predetermined value is equal to a power ratio of the part of the output signal from the S1 path this is attributable to a known (signal) portion of the second signal S2 relative to a minimum SNR of the output signal from the S1 path.

Figure 6:
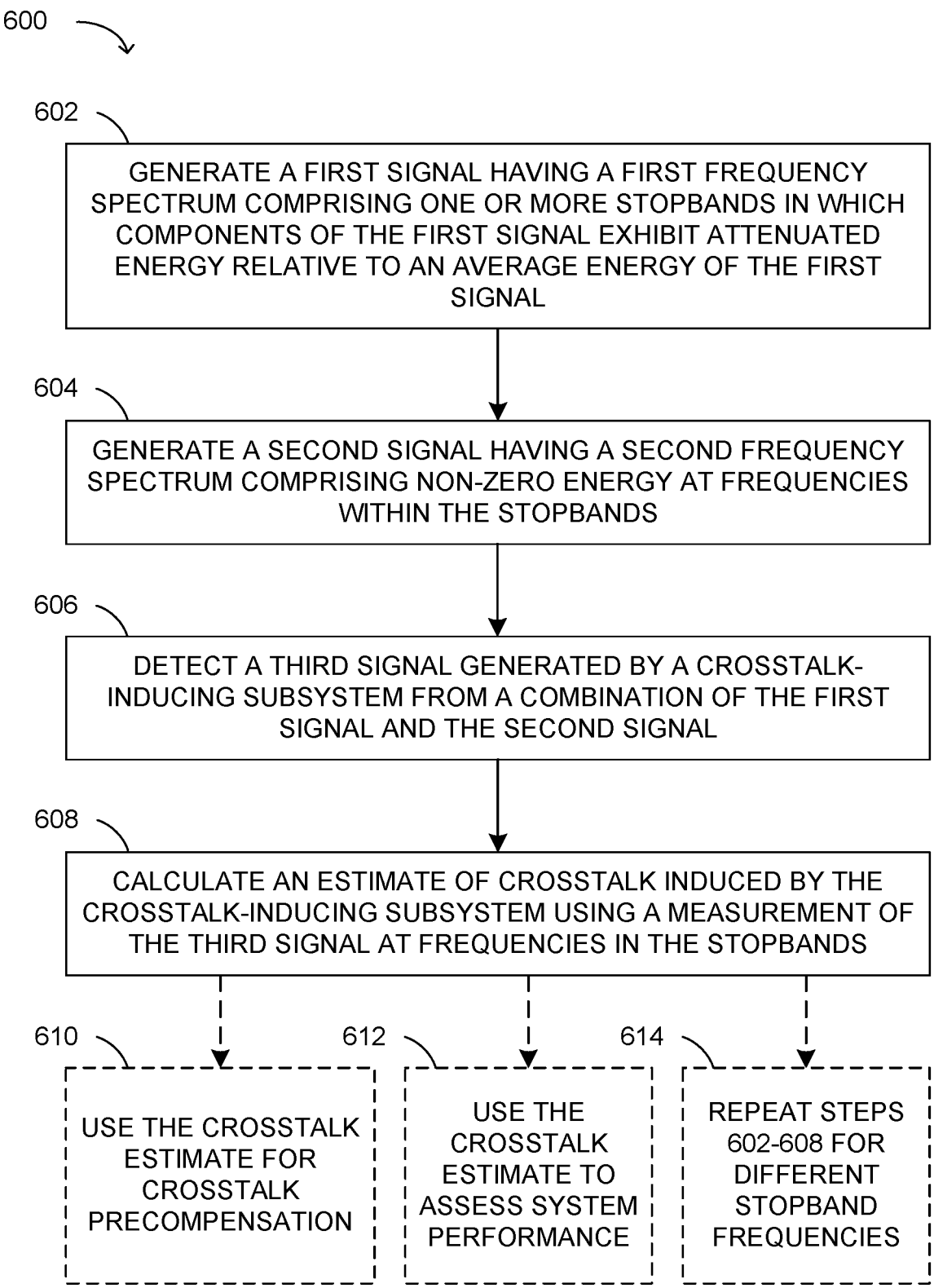
FIG. 6 illustrates an example method for measuring crosstalk in accordance with some examples of the technology disclosed herein.
Figure 7:
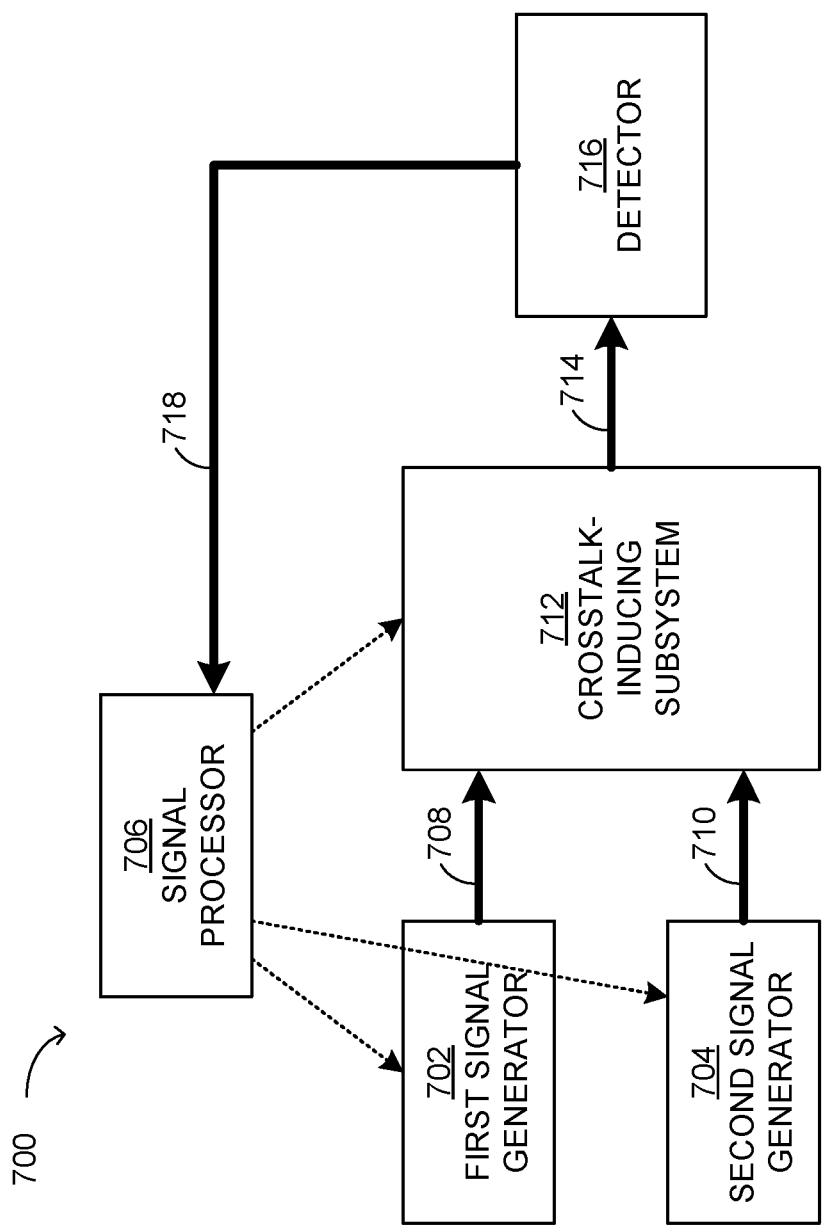
FIG. 7 illustrates an example system for measuring crosstalk in accordance with some examples of the technology disclosed herein.

FIG. 6 illustrates an example method 600 for measuring crosstalk in accordance with some examples of the technology disclosed herein. The method may be implemented in a system comprising one or more electronic devices, such as the system 700 as illustrated in FIG. 7.

At 602, a first signal is generated having a first frequency spectrum comprising one or more stopbands in which components of the first signal exhibit attenuated energy relative to an average energy of the first signal. According to some examples, the components of the first signal may exhibit negligible energy within the one or more stopbands, such that the energy of the first signal within the one or more stopbands is substantially zero. For example, the first signal may comprise the signal S1 described with respect to FIGS. 4 and 5, where S1($f_{STOP}$)=0. The first signal may be generated, for example, by applying a stopband filter to a broadband signal and loading the result into a DAC, such as the DAC1 described with respect to FIG. 1. According to some examples, the components of the first signal S1 within the one or more stopbands may comprise a known energy portion, $S1_{KNOWN}(f_{STOP})$, which may be non-zero, as well as an unknown energy portion, $S1_{UNKNOWN}(f_{STOP})$. The unknown energy portion may be negligible. For example, $S1_{UNKNOWN}(f_{STOP})$ may be considered negligible in the event that one or more of Equations 3, 4, and 5 have been satisfied.

At 604, a second signal is generated having a second frequency spectrum comprising non-zero energy at frequencies within the stopbands. According to one example, the second signal may exhibit a broadband frequency spectrum, such as the signal S2 described with respect to FIG. 4. According to another example, the second signal may comprise a tone within at least one of the stopbands, such as the signal S2 described with respect to FIG. 5. According to some examples, where the second signal comprises a tone, the tone may comprise the same power spectral density that the second signal would have if it was in operation and carrying data. According to some examples, the components of the second signal S2 within the one or more stopbands may comprise a known energy portion, $S2_{KNOWN}(f_{STOP})$, as well as an unknown energy portion, $S2_{UNKNOWN}(f_{STOP})$. According to some examples, $S2_{UNKNOWN}(f_{STOP})$ may be significantly lower than $S2_{KNOWN}(f_{STOP})$. For example, $S2_{UNKNOWN}(f_{STOP})$ may be negligible relative to $S2_{KNOWN}(f_{STOP})$.

The first and second signals may be generated in a different order than described with respect to FIG. 6. For example, the second signal may be generated before the first signal, or the first and second signals may be generated simultaneously.

At 606, a third signal is detected, the third signal having been generated by a crosstalk-inducing subsystem from a combination of the first signal generated at 602 and the second signal generated at 604. For example, referring to the system 100, the crosstalk-inducing subsystem may comprise any circuitry in the path between the input signals 130 and 132 and the output signal 124, including the amplifiers 134 and 136 and the modulators MZ1 and MZ2. According to one example, where the second signal generated at 604 exhibits a broadband frequency spectrum, such as the signal S2 described with respect to FIG. 4, the third signal detected at 606 may be represented by the signal $S_E$ described with respect to FIG. 4. According to another example, where the second signal generated at 604 exhibits a tone within at least one of the stopbands, such as the signal S2 described with respect to FIG. 5, the third signal detected at 606 may be represented by the signal $S_J$ described with respect to FIG. 5.

At 608, an estimate of crosstalk induced by the crosstalk-inducing subsystem is calculated using a measurement of the third signal at frequencies within the one or more stopbands. According to one example, as described with respect to FIG. 4, a measurement of $S_E(f_{STOP})$ may be used to calculate the crosstalk term S2·H21. With knowledge of $S2(f_{STOP})$, the measurement of $S_E(f_{STOP})$ may also be used to calculate an estimate of the crosstalk transfer function H21, including both the amplitude response and the phase response. According to another example, as described with respect to FIG. 5, a measurement of $S_J(f_{STOP})$ may be used, together with knowledge of $S_2(f_{STOP})$, to calculate another estimate of the crosstalk transfer function H21, including both the amplitude response and the phase response.

Optionally, at 610, the crosstalk estimate calculated at 608 may be used for crosstalk precompensation. For example, as described previously, an estimate of the crosstalk transfer function H21 may be used to calculate the crosstalk precompensation term (S2·H21/H11), which may then be subtracted from the signal S1 to reduce the crosstalk exhibited by the crosstalk-inducing system.

Optionally, at 612, the crosstalk estimate calculated at 608 may be used to assess system performance. For example, a quantitative or qualitative assessment of system performance may be determined based on the crosstalk estimate. The assessment may comprise an indication of whether or not the system is operating within certain limits or satisfying certain minimum requirements, or an indication of how close the system is to failure. The assessment may be stored in memory, transmitted to another electronic device, or displayed on a display screen.

Optionally, at 614, the steps used to calculate the estimate of crosstalk may be repeated for different stopband frequencies. According to one example, a new version of the first signal may be generated at 602 with a new stopband located at a different position in the frequency spectrum, and a new version of the second signal may be generated at 604 with non-negligible energy at the new stopband. At 606, a new version of the third signal may be detected from the crosstalk-inducing subsystem based on a combination of the new versions of the first and second signals. At 608, a measurement of the new version of the third signal at a frequency within the new stopband may be used to estimate crosstalk at that frequency. By repeating this process, it may be possible to characterize the frequency dependence of the crosstalk. In general, a plurality of different version of the first signal may be generated, where each different version comprises at least one stopband that is unique amongst all stopbands comprised in the plurality of different versions of the first signal. A plurality of different versions of the second signal may be generated which correspond, respectively, to the plurality of different versions of the first signal. According to some examples, each different version of the second signal may comprise a tone within the at least one unique stopband of the corresponding version of the first signal. Ultimately, a plurality of different crosstalk estimates may be calculated, where each crosstalk estimate is calculated using a measurement of a different version of the third signal at frequencies within the at least one unique stopband.

Alternatively, rather than repeating steps 602-608 for different stopband frequencies, the frequency dependence of the crosstalk may be characterized by generating a first signal S1 having a first frequency spectrum comprising a plurality of distinct stopbands, where each stopband is located at a different position in the first frequency spectrum. The second signal S2 may have a second frequency spectrum exhibiting non-zero energy in each of the plurality of distinct stopbands. The second frequency spectrum of the second signal S2 may be designed such that none of the S2·H22 non-linear harmonics are at frequencies within higher frequency stopbands of S1. According to some examples, where the second signal comprises a plurality of tones, the tones may comprise the same power spectral density as the second signal would have if it was in operation and carrying data. A plurality of measurements of the third signal may be obtained concurrently at frequencies within each of the plurality of distinct stopbands, and these measurements may be used to determine how the crosstalk varies as a function of frequency.

FIG. 7 illustrates an example system 700 for measuring crosstalk in accordance with some examples of the technology disclosed herein. The various elements of the system 700 may be comprised in one or more electronic devices. For example, the elements may be comprised in a transmitter electronic device configured to transmit communications signals in a communications network. The system 700 may comprise additional elements to those illustrated in FIG. 7.

The system 700 may comprise a first signal generator 702, a second signal generator 704, and a signal processor 706. According to some examples, the signal processor 706 may comprise a DSP. The signal processor 706 may be configured to control the signal generators 702 and 704, as denoted by the dotted arrows. According to one example, the signal processor 706 may be configured to cause the first signal generator 702 to generate a first signal 708 having a first frequency spectrum comprising one or more stopbands in which components of the first signal 708 exhibit attenuated energy relative to an average energy over the first frequency spectrum. The signal processor 706 may further be configured to cause the second signal generator 704 to generate a second signal 710 having a second frequency spectrum exhibiting non-zero energy at frequencies within the one or more stopbands. According to some examples, the second frequency spectrum may exhibit a tone within at least one of the stopbands. The signal processor 706, in combination with the first signal generator 702 and the second signal generator 704, may be configured to implement steps 602 and 604 of the method 600.

The system 700 may further comprise a crosstalk-inducing subsystem 712 which is configured to receive the first signal 708 and the second signal 710, and to generate a third signal 714 based on a combination of the first signal 708 and the second signal 710. The signal processor 706 may be configured to control the crosstalk-inducing subsystem 712, as denoted by the dotted arrow. For example, where the crosstalk-inducing subsystem 712 comprises parallel Mach-Zehnder modulators, such as MZ1 and MZ2 described with respect to the system 100, the signal processor 706 may be configured to control the respective bias points B1 and B2 of the modulators.

The system 700 may further comprise a detector 716 which is configured to detect the third signal 714 generated by the crosstalk-inducing subsystem 712. The detector 716 may be configured to convert the optical signal 714 into an electrical signal, and to capture and process the electrical signal. The detector 716 may be configured to at least temporarily store the electrical signal, either in the time domain or the frequency domain. According to some examples, the detector 716 may comprise detection system consisting of a plurality of elements. For example, the detector 716 may comprise a photodetector, a transimpedance amplifier, and an oscilloscope. The detector 716 may be configured to implement step 606 of the method 600.

Based on the detected third signal 714, the detector 716 may generate measurements 718 which may be provided to the signal processor 706 for processing. For example, where the measurements 718 comprise a time-domain representation of the output signal 714, the signal processor 706 may be configured to apply a Fourier transform to the measurements 718 to generate a frequency-domain representation of the output signal 714. The signal processor 706 may then calculate an estimate of crosstalk using components of the frequency-domain representation at frequencies in the stopbands. The signal processor 706 may be configured to implement step 608 of the method 600.

According to some examples, the crosstalk estimates calculated in the signal processor 706 may be used by the signal processor 706 to calculate crosstalk precompensation terms, as described with respect to the optional step 610 in the method 600. The signal processor 706 may cause the first signal generator 702 and the second signal generator 704 apply the appropriate precompensation terms to mitigate crosstalk in the subsystem 712.

According to some examples, the crosstalk estimates calculated in the signal processor 706 may be used to provide an assessment of the performance of the system 700, as described with respect to the optional step 612 of the method 600.

According to some examples, the signal processor 706 may be configured to cause either one of the signal generators 702 and 704 to transmit additional signals exhibiting stopbands at a variety of different stopband frequencies, and to use the resulting measurements 718 to calculate estimates of crosstalk at the various stopband frequencies, as described with respect to the optional step 614 of the method 600.

According to some examples, the system 700 may implement one or more steps of the method 600 using an application specific integrated circuit (ASIC), a field programmable gate array (FPGA), or computer comprising a processor and a memory storing computer-executable code. Analog signal processing could also be used to implement one or more steps of the method 600.

The preceding examples have been described in the context of measuring crosstalk between of two input signals based on a single output signal. However, the systems and methods described herein may be applied to other combinations of input signals and output signals.

For example, instead of a single detector 716 being used to detect a single output signal 714, multiple detectors may be used to detect multiple output signals. For example, referring to the system 100, the signals 118 and 120 may be detected by two separate detectors.

In another example, the systems and methods described herein may be extended to measurements of crosstalk between more than two input signals. For example, in a multiple-input multiple-output (MIMO) system such as a wavelength division multiplexed (WDM) communications system, an array of modulators may be used to independently modulate multiple input signals and generate multiple output signals. The modulation may be performed, for example, using a single chip multiple channel modulator, which may induce crosstalk between the channels. It may be possible to estimate the crosstalk in this type of MIMO system by extending the model 200 to incorporate additional transfer functions that reflect the additional signals. For example, in the case of M input signals S1, S2, ..., SM, the 2×2 matrix in Equation 1 may be replaced with a M×M matrix consisting of $M^2$ transfer functions. Crosstalk may be estimated by applying steps 602-606 of the method 600 to different pairs of the M input signals. For example, to determine the crosstalk from the $J^{th}$ input signal to the path of the $K^{th}$ input signal, the $K^{th}$ input signal may be generated according to step 602 (i.e., such that it comprises one or more stopbands), and $J^{th}$ input signal may be generated according to step 604 (i.e., such that it comprises non-zero energy at frequencies within the stopbands). The remaining M−2 input signals in the MIMO system may either be designed to comprise stopbands at the same frequencies as the stopbands of the $K^{th}$ input signal, or they may be turned off. In any event, the signal detected at 606, within the one or more stopbands, will be reflective of the crosstalk from the $J^{th}$ input signal to the path of the $K^{th}$ input signal, since the other input signals do not contribute to the detected signal. This process may be repeated for different pairs of input signals until all of the combinations have been cycled through.

Techniques for measuring crosstalk have been described herein with reference to optical communications systems. However, similar techniques may be applied to other types of communications systems. For example, in 5G wireless systems, crosstalk may be induced during transmission of multiple signals from multiple antennas. It may be possible to estimate the crosstalk between the electrical paths of these signals using the methods described herein.

The scope of the claims should not be limited by the details set forth in the examples, but should be given the broadest interpretation consistent with the description as a whole.

What is claimed is:

1. A system comprising:
   circuitry configured to generate a first electrical signal having a first frequency spectrum comprising one or more stopbands in which components of the first electrical signal exhibit attenuated energy relative to an average energy of the first electrical signal;
   circuitry configured to generate a second electrical signal having a second frequency spectrum comprising non-zero energy at frequencies within the one or more stopbands;

circuitry configured to detect an optical signal generated by a crosstalk-inducing subsystem, wherein the optical signal is based on the first electrical signal and the second electrical signal, and wherein the crosstalk-inducing subsystem induces crosstalk between signal paths of the first and second electrical signals; and circuitry configured to calculate an estimate of the crosstalk induced by the crosstalk-inducing subsystem using a measurement of the optical signal at the frequencies within the one or more stopbands.

2. The system as claimed in claim 1, wherein the second frequency spectrum comprises a tone within at least one of the stopbands.

3. The system as claimed in claim 1, further comprising circuitry configured to generate a plurality of different versions of the first electrical signal, each different version of the first electrical signal having a different frequency spectrum comprising one or more stopbands in which components of the different version of the first electrical signal exhibit attenuated energy relative to an average energy of the different version of the first electrical signal, and wherein each different frequency spectrum comprises at least one stopband that is unique amongst all stopbands comprised in the plurality of different versions of the first electrical signal;

circuitry configured to detect a plurality of different versions of the optical signal, each different version of the optical signal corresponding to a respective one of the plurality of different versions of the first electrical signal; and circuitry configured to calculate a plurality of different crosstalk estimates, each crosstalk estimate calculated using a measurement of a respective one of the plurality of different versions of the optical signal at frequencies within the at least one unique stopband.

4. The system as claimed in claim 3, further comprising circuitry configured to generate a plurality of different versions of the second electrical signal respectively corresponding to the plurality of different versions of the first signal, each different version of the second electrical signal having a different frequency spectrum comprising a tone within the at least one unique stopband of the corresponding version of the first electrical signal.

5. The system as claimed in claim 1, further comprising the crosstalk-inducing subsystem, and wherein the crosstalk-inducing subsystem comprises
a first electrical-to-optical (E/O) modulator configured to be driven based on the first electrical signal; and
a second E/O modulator configured to be driven based on the second electrical signal,
wherein the first E/O modulator is biased for intensity detection and the second E/O modulator is biased for minimum transmission.

6. The system as claimed in claim 1, further comprising circuitry configured to calculate at least one crosstalk precompensation term using the estimate of the crosstalk.

7. The system as claimed in claim 1, further comprising circuitry configured to provide an assessment of system performance based on the estimate of the crosstalk.

8. The system as claimed in claim 1, wherein a known portion of the attenuated energy of the first electrical signal is substantially zero, and wherein a known portion of the non-zero energy of the second electrical signal is significantly greater than any noise portion of the non-zero energy of the second electrical signal.

9. The system as claimed in claim 8, wherein a part of the optical signal attributable to any noise portion of the attenuated energy of the first electrical signal does not exceed a predetermined value, wherein the predetermined value is equal to a power ratio of a part of the optical signal attributable to the known portion of the non-zero energy of the second electrical signal relative to a minimum signal-to-noise ratio (SNR) of the optical signal.

10. The system as claimed in claim 1, further comprising circuitry configured to generate one or more additional electrical signals, each additional electrical signal having a different frequency spectrum comprising one or more stopbands in which components of the additional electrical signal exhibit attenuated energy relative to an average energy of the additional electrical signal;

circuitry configured to detect one or more additional optical signals, wherein each additional optical signal is generated by the crosstalk-inducing subsystem based on the first electrical signal, one of the additional electrical signals, and the second electrical signal; and circuitry configured to calculate the estimate of the crosstalk induced by the crosstalk-inducing subsystem using measurement of the one or more additional optical signals at the frequencies within the one or more stopbands.

11. A method comprising:

generating a first electrical signal having a first frequency spectrum comprising one or more stopbands in which components of the first electrical signal exhibit attenuated energy relative to an average energy of the first electrical signal;

generating a second electrical signal having a second frequency spectrum comprising non-zero energy at frequencies within the one or more stopbands;

detecting an optical signal generated by a crosstalk-inducing subsystem, the third signal is based on the first electrical signal and the second electrical signal, and wherein the crosstalk-inducing subsystem induces crosstalk between signal paths of the first and second electrical signals; and calculating an estimate of the crosstalk induced by the crosstalk-inducing subsystem using a measurement of the optical signal at the frequencies within the one or more stopbands.

12. The method as claimed in claim 11, wherein the second frequency spectrum comprises a tone within at least one of the stopbands.

13. The method as claimed in claim 11, further comprising generating a plurality of different versions of the first electrical signal, each different version of the first electrical signal having a different frequency spectrum comprising one or more stopbands in which components of the different version of the first electrical signal exhibit attenuated energy relative to an average energy of the different version of the first electrical signal, and wherein each different frequency spectrum comprises at least one stopband that is unique amongst all stopbands comprised in the plurality of different versions of the first electrical signal;

detecting a plurality of different versions of the optical signal, each different version of the optical signal corresponding to a respective one of the plurality of different versions of the first electrical signal; and calculating a plurality of different crosstalk estimates, each crosstalk estimate calculated using a measurement of a respective one of the plurality of different versions of the optical signal at frequencies within the at least one unique stopband.

14. The method as claimed in claim 13, further comprising
generating a plurality of different versions of the second electrical signal respectively corresponding to the plurality of different versions of the first signal, each different version of the second signal having a different frequency spectrum comprising a tone within the at least one unique stopband of the corresponding version of the first electrical signal.

15. The method as claimed in claim 11, further comprising
driving a first electrical-to-optical (E/O) modulator based on the first electrical signal; and
driving a second E/O modulator based on the second electrical signal,
wherein the first E/O modulator is biased for intensity detection and the second E/O modulator is biased for minimum transmission.

16. The method as claimed in claim 11, further comprising
calculating at least one crosstalk precompensation term using the estimate of the crosstalk.

17. The method as claimed in claim 11, further comprising
providing an assessment of system performance based on the estimate of the crosstalk.

18. The method as claimed in claim 11, wherein a known portion of the attenuated energy of the first electrical signal is substantially zero, and wherein a known portion of the non-zero energy of the second electrical signal is significantly greater than any noise portion of the non-zero energy of the second electrical signal.

19. The method as claimed in claim 18, wherein a part of the optical signal attributable to any noise portion of the attenuated energy of the first electrical signal does not exceed a predetermined value, wherein the predetermined value is equal to a power ratio of a part of the optical signal attributable to the known portion of the non-zero energy of the second electrical signal relative to a minimum signal-to-noise ratio (SNR) of the optical signal.

20. The method as claimed in claim 11, further comprising
generating one or more additional electrical signals, each additional electrical signal having a different frequency spectrum comprising one or more stopbands in which components of the additional electrical signal exhibit attenuated energy relative to an average energy of the additional electrical signal;
detecting one or more additional optical signals, wherein each additional optical signal is generated by the crosstalk-inducing subsystem based on the first electrical signal, one of the additional electrical signals, and the second electrical signal; and
calculating the estimate of the crosstalk induced by the crosstalk-inducing subsystem using measurement of the one or more additional optical signals at the frequencies within the one or more stopbands.

* * * * *